Patented May 19, 1931

1,805,473

UNITED STATES PATENT OFFICE

LESTER V. ADAMS, OF SCHENECTADY, NEW YORK, ASSIGNOR TO GENERAL ELECTRIC COMPANY, A CORPORATION OF NEW YORK

SYNTHETIC RESIN AND PROCESSES OF MAKING THE SAME

No Drawing.   Application filed May 1, 1928.   Serial No. 274,370.

The present invention relates to the class of synthetic or artificial resins known as alkyd resins. Alkyd resins comprise those complexes resulting from the reaction of a polyhydric-alcohol, such as glycerine, and a polybasic acid, such as phthalic anhydride, with or without other reacting ingredients.

It is the main object of my invention to improve the qualities of an alkyd resin, and in particular to carry out the condensation reaction in such way as to cause a more rapid esterification of the resin ingredients and to produce improved chemical and physical properties in the resinous product.

In accordance with my invention the condensation or resinifying reaction between polyhydric alcohol and polybasic acid is carried out in the presence of an organic compound of a polyvalent metal, generically known as a soap, which takes part in the resin reaction. As a consequence, resins are produced which are quicker setting and have improved physical properties varying with the nature of the metal compounds which are used.

The following specific examples are illustrative of my invention:

*Example 1.*—In the preparation of a resin from phthalic anhydride and glycerine, cobalt linoleate may be introduced to improve the toughness and shock-resistance of the resin. Only a few per cent of cobalt linoleate is required. An improved resin can be prepared by heating the following ingredients by weight in a container to about 200° C. while continually agitating the mixture:

|                     | Parts |
|---------------------|-------|
| Phthalic anhydride  | 68.8  |
| Glycerine           | 28.3  |
| Cobalt linoleate    | 2.9   |

The resin, as is usual, is first produced in the fusible, soluble condition and is converted to the infusible, insoluble state by heating. In place of phthalic anhydride an equal quantity of succinic anhydride may be employed in order to make a still tougher resin. The succinic anhydride may be first melted and the cobalt linoleate then may be added to the melt. When complete solution or blending of the ingredients has taken place, the glycerine or other alcoholic constituent is added and the reaction is completed. Lead oleate may be used in the manufacture of an alkyd resin in similar proportions and will produce similar results.

*Example 2.*—Aluminum stearate may be caused to react with phthalic anhydride and glycerine to produce a resin which is more water-resistant than the resin made solely from phthalic anhydride and glycerine. The following proportions by weight may be heated to produce a resin in accordance with known procedure.

|                     | Parts |
|---------------------|-------|
| Phthalic anhydride  | 65.3  |
| Glycerine           | 32.6  |
| Aluminum stearate   | 2.1   |

*Example 3.*—By the use of metal lactates, such as ferric lactate or bismuth lactate, resins may be made which are rapidly convertible from the fusible to the infusible state and which are tough and strong. The following are illustrative examples by weight:

|                            | Parts |
|----------------------------|-------|
| Phthalic anhydride         | 63.1  |
| Glycerine                  | 26.4  |
| Ferric or bismuth lactate  | 10.5  |

Instead of phthalic anhydride an equal quantity of diphenic acid may be employed to make a resin. Care should be used when carrying out the reaction with bismuth lactate as considerable frothing occurs.

The metallic constituents may be introduced into the resin reaction by first combining a metal as for example calcium, with the polyhydric alcohol constituent of the resin and then causing the polybasic acid to react with the product. The polyhydric alcohol, for example glycerine, reacts with alkaline earths and lead oxide to form metallic glyceroxides. Such modification of my invention is illustrated by the following example:

*Example 4.*—Glycerine is brought into contact with fragments of clean metallic calcium for a sufficient length of time to permit chemical reaction to occur, during which time gas evolution and foaming occurs. During this stage of the reaction the calcium apparently both combines with a part of the glycerine and with any water which may be associated with the glycerine. The calcium combines with the glycerine to form a compound which upon the addition of phthalic anhydride reacts with the phthalic anhydride to form a calcium phthalate. When the first stage of the reaction has proceeded for two or three days the calcium may be removed entirely. Upon removal of the calcium, the glycerine is caused to react with a desired polybasic acid, such as phthalic anhydride. For example, 10 parts of glycerine which has been treated with calcium are caused to react with 24.3 parts by weight of phthalic anhydride by heating gradually with a slowly rising temperature for 2¾ hours while stirring to cause resinification. The mixture first is clear and upon continued heating becomes cloudy. At about 210° C. it appears greasy or oily. When a loss in weight of about 10.8% has occurred and the temperature has risen to about 225° C. the liquid is poured into a suitable container. Upon cooling it hardens to form an opalescent or translucent resin which is soluble in ordinary solvents and may be utilized for the various purposes for which resins commonly are employed, such as making varnishes molded parts as a cement or as an impregnating material.

Instead of causing the metallic calcium to combine with the glycerine a combination may be produced initially between the calcium and the phthalic anhydride thus forming calcium phthalate which together with uncombined phthalic anhydride may be caused to react with the glycerine.

*Example 5*.—Commercially pure glycerine and phthalic anhydride in the proportion by weight of 10:24.3 may be admixed in a suitable container and heated until the anhydride is fused. Lumps of clean metallic calcium then may be introduced. The temperature of the mixture then is increased to about 200° to 220° C. while stirring until a test sample shows that resin formation has occurred. The calcium then is removed.

If desired the methods of these two examples may be used in combination by mixing the phthalic anhydride or suitable polybasic acid with glycerine previously treated with an alkaline earth metal and carrying out the condensation reaction in the presence of such metal.

Resins containing calcium compounds are more resistant to steam and boiling water than resins produced in the absence of such catalysts. If desired, opaque fillers may be introduced into the resin which in their absence is translucent.

Among the other organic compounds of a metal and an organic acid, which may be utilized in carrying out my invention I may mention zinc resinate, which when used with glycerine and phthalic anhydride in producing a resin produces a resin of greater toughness and is capable of quicker conversion to the infusible, insoluble state. Manganese resinate when used in a similar way improves the hardness of the resulting resin. Lead glyceroxide also may be used in a manner similar to that described above in connection with the use of calcium glyceroxide. In other words, following the procedure outlined in Example 4, and substituting lead oxide for the alkaline earth metal, a resin will be obtained in which is incorporated lead glyceroxide. Lead glyceroxide is a compound of glycerine and lead oxide. Lead tannate, a compound of the aromatic series, can be used with alkyd resin ingredients to improve the curing or hardening properties of the resulting resin.

In the preparation of resins embodying my invention, various polyhydric alcohols, such as glycol, mannitol, or erythritol, can be employed in place of glycerine and various polybasic acids, such as succinic acid, cinnamic acid, diphenic or naphthalic acids may be employed in place of phthalic acid or its anhydride. Various auxiliary reacting ingredients, such as oleic, linolic, linolenic or other monobasic acids may be combined with the alkyd resins in carrying out my invention.

What I claim as new and desire to secure by Letters Patent of the United States, is:

1. A resin resulting from the reaction of a polyhydric alcohol, a polybasic acid and an organic compound of a metal.

2. An alkyd resin containing combined therewith a compound of an alkaline earth metal and an organic acid.

3. An alkyd resin containing chemically combined therewith a compound of calcium with a polybasic acid.

4. An alkyd resin containing combined therewith lead glyceroxide.

5. An alkyd resin containing combined therewith cobalt linoleate.

6. A resin resulting from the reaction of a polyhydric alcohol, a polybasic acid, and a compound of a polyvalent metal and an organic acid.

7. A resin resulting from the reaction of a polyhydric alcohol, a polybasic acid, and a calcium soap.

8. The method which consists in heating to a temperature of about 200° C. a polyhydric alcohol, a polybasic acid and a soap of a polyvalent metal until a resinous compound has been formed.

9. The method of making a resinous material which consists in causing chemical reaction between a polyhydric alcohol and an alkaline earth metal, removing uncombined excess of said metal and causing reaction between said alcohol and a resinifying acid.

10. The method of making a resinous material which consists in treating glycerine with metallic calcium, removing any uncombined calcium which may remain and combining said glycerine with phthalic anhydride.

In witness whereof I have hereunto set my hand this 30th day of April, 1928.

LESTER V. ADAMS.